United States Patent
Hyeon (10) Patent No.: US 10,123,071 B2
(45) Date of Patent: Nov. 6, 2018

(54) ELECTRONIC APPARATUS, CONTROLLING METHOD THEREOF AND DISPLAY SYSTEM COMPRISING ELECTRONIC APPARATUS AND A PLURALITY OF DISPLAY APPARATUSES

(71) Applicant: SAMSUNG ELECTRONICS CO., LTD., Suwon-si (KR)

(72) Inventor: Byeong-cheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/671,277

(22) Filed: Aug. 8, 2017

(65) Prior Publication Data

US 2018/0152752 A1  May 31, 2018

(30) Foreign Application Priority Data

Nov. 30, 2016  (KR) .................. 10-2016-0161876

(51) Int. Cl.
| | | |
|---|---|---|
| *H04N 5/46* | (2006.01) | |
| *H04N 21/435* | (2011.01) | |
| *G06F 3/14* | (2006.01) | |

(52) U.S. Cl.
CPC ....... *H04N 21/4355* (2013.01); *G06F 3/1423* (2013.01); *G09G 2370/022* (2013.01)

(58) Field of Classification Search
CPC ............... H04N 21/4355; G06F 3/1423; G09G 2370/022
USPC ...................................................... 348/556
See application file for complete search history.

(56) References Cited

U.S. PATENT DOCUMENTS

| | | | |
|---|---|---|---|
| 9,398,240 B2 | 7/2016 | Lida et al. | |
| 2003/0206179 A1* | 11/2003 | Deering | G06T 3/0081 |
| | | | 345/589 |
| 2007/0011552 A1* | 1/2007 | Altmann | H04L 1/0061 |
| | | | 714/746 |
| 2012/0038660 A1* | 2/2012 | Han | G09G 3/2003 |
| | | | 345/590 |
| 2014/0063187 A1* | 3/2014 | Tsukagoshi | H04N 13/0059 |
| | | | 348/43 |
| 2014/0204994 A1* | 7/2014 | Altmann | H04N 19/46 |
| | | | 375/240.01 |
| 2016/0134909 A1* | 5/2016 | Eyer | H04N 5/44508 |
| | | | 725/146 |

FOREIGN PATENT DOCUMENTS

| | | |
|---|---|---|
| CN | 201477571 U | 5/2010 |
| CN | 104978929 A | 10/2015 |
| CN | 103400549 B | 4/2016 |
| KR | 10-1374648 B1 | 3/2014 |

\* cited by examiner

*Primary Examiner* — Michael Lee
(74) *Attorney, Agent, or Firm* — Sughrue Mion, PLLC

(57) ABSTRACT

An electronic apparatus is disclosed. The electronic apparatus includes a communicator configured to communicate with at least one of a plurality of display apparatuses and a processor configured to generate an image signal by converting correction data regarding each pixel of the plurality of display apparatuses into a data format according to an image signal standard, and control the communicator to transmit the image signal to any one of the plurality of display apparatuses through an interface corresponding to the image signal standard.

16 Claims, 9 Drawing Sheets

| (1,1) | (2,1) | (3,1) | ... | (160,1) |
|---|---|---|---|---|
| (1,2) | (2,2) | ... | ... | ... |
| ... | | | | ... |
| (1,120) | | | | (160,120) |

| a | | |
|---|---|---|
| 16384 | 16 | 42 |
| 25 | 14532 | 2 |
| 35 | 11 | 12052 |

| (1,2) | (2,2) | (3,2) | ... | (160,2) |
|---|---|---|---|---|
| (1,3) | (2,3) | ... | ... | ... |
| ... | | | | ... |
| (1,1210) | | | | (160,120) |

FIG. 5

| (1,1) 30bit | (2,1) 30bit | (3,1) 30bit | (4,1) 30bit | ... | (1280,1) |
|---|---|---|---|---|---|
| (1,2) 30bit | (2,2) 30bit | ... | ... | ... | ... |
| ... | | | | | ... |
| (1,720) | | | | | (1280,720) |

| (1,1) | (2,1) | ... | (320,1) | ... | (480,1) |
|---|---|---|---|---|---|
| (1,2) | (2,2) | ... | ... | ... | (480,2) |
| ... | ... | ... | ... | ... | ... |
| (1,360) | (2,360) | ... | ... | ... | (480,360) |
| (1,361) | (2,361) | ... | (320,361) | ... | (480,361) |
| (1,362) | (2,362) | ... | ... | ... | (480,362) |
| ... | ... | ... | ... | ... | ... |
| (1,720) | (2,720) | ... | (320,720) | ... | (480,720) |
| (1,721) | (2,721) | ... | (320,721) | ... | (480,721) |
| (1,722) | (2,722) | ... | ... | ... | (480,722) |
| ... | ... | ... | ... | ... | ... |
| (1,1080) | (2,1080) | ... | (320,1080) | ... | (480,1080) |

ELECTRONIC APPARATUS, CONTROLLING METHOD THEREOF AND DISPLAY SYSTEM COMPRISING ELECTRONIC APPARATUS AND A PLURALITY OF DISPLAY APPARATUSES

CROSS-REFERENCE TO RELATED APPLICATION

This application claims priority from Korean Patent Application No. 10-2016-0161876, filed in the Korean Intellectual Property Office on Nov. 30, 2016, the disclosure of which is incorporated herein by reference in its entirety.

BACKGROUND

1. Field

Methods, apparatuses and systems consistent with exemplary embodiments relate to an electronic apparatus, a control method thereof and a display system including the electronic apparatus and a plurality of display apparatuses, and more particularly, to an electronic apparatus which transmits correction data through an image signal path, a control method thereof and a display system including the electronic apparatus and a plurality of display apparatuses.

2. Related Art

Display apparatuses vary in size according to usage. Sizes range from a small size display apparatus which is applied to a mobile apparatus to a large size display apparatus which is used for advertisement.

To increase visibility or to configure a bigger screen, a single image may be displayed using a plurality of display apparatuses.

In a large screen display configured with a plurality of display apparatuses, color may differ between display apparatuses, and the output image is unnaturally displayed. To resolve such a problem, color correction of display apparatus is necessary.

In existing technology, a method of transmitting correction data to a plurality of display apparatuses is used by repeatedly transmitting correction data by individually connecting an electronic apparatus (e.g., a personal computer (PC)) where the correction data is stored with each display apparatus through a jig, and after the correction data is transmitted to each individual display apparatus, the cable is removed and connected to another display apparatus.

However, such a method takes a long time, and is inconvenient because a user must manually connect each display apparatus. For example, if a large screen display is configured with 200 displays, the repeated series of operations—connecting a cable, writing correction data (30 seconds) and disconnecting the cable—would take about seven to eight minutes for each display apparatus, which may take three days and cause inconvenience.

SUMMARY

Exemplary embodiments relate to an electronic apparatus which transmits correction data through an image signal path, a control method thereof and a display system including the electronic apparatus and a plurality of display apparatuses.

According to an aspect of an exemplary embodiment, there is provided an electronic apparatus, including: a communicator configured to communicate with at least one of a plurality of display apparatuses; and a processor configured to generate an image signal by converting correction data regarding each pixel of the plurality of display apparatuses into a data format according to an image signal standard, and control the communicator to transmit the image signal to any one of the plurality of display apparatuses through an interface corresponding to the image signal standard.

The processor may be further configured to divide correction data regarding a single pixel of one of the plurality of display apparatuses into a plurality of data units based on a pixel data size which is defined in the data format, and generate the image signal by including each of the plurality of data units as individual pixel data.

The processor may be further configured to include identification information identifying a corresponding display apparatus to which the plurality of data units are transmitted, among the plurality of display apparatuses.

The processor may be further configured to control the communicator to transmit control data indicating one among a first mode in which a display operation with respect to the image signal transmitted through the interface is performed and a second mode in which a display operation is not performed to the plurality of display apparatuses.

The processor may be further configured to control the communicator to transmit the control data indicating the second mode when the image signal is transmitted.

The processor may be further configured to control the communicator to transmit the control data indicating the first mode to the plurality of display apparatuses in response to a pre-set period of time passing after the control data indicating the second mode is transmitted.

The processor may be further configured to control the communicator to transmit the control data indicating the first mode to the plurality of display apparatuses in response to receiving information notifying completion of correction data storage from each of the plurality of display apparatuses.

The interface corresponding to the image signal standard may be one among a high-definition multimedia interface (HDMI), a low-voltage differential signaling (LVDS), a digital video interface (DVI), a display port (DP) and an HDBaseT (HDBT).

The electronic apparatus may further include: a photographing unit configured to photograph an image which is displayed on the plurality of display apparatuses, and the processor may be further configured to generate the correction data based on the photographed image.

According to an aspect of another exemplary embodiment, there is provided a display system, including: a plurality of display apparatuses; and an electronic apparatus configured to generate an image signal by converting correction data regarding each pixel of the plurality of display apparatuses into a data format according to an image signal standard, and transmit the image signal to any one of the plurality of display apparatuses through an interface corresponding to the image signal standard.

Each of the plurality of display apparatuses may be configured to operate in a first mode in which a display operation with respect to the image signal transmitted through the interface is performed and a second mode in which a display operation is not performed.

The electronic apparatus may be further configured to transmit control data indicating one among the first mode and the second mode to the plurality of display apparatuses, and each of the plurality of display apparatuses may be further configured to not perform a display operation with respect to the image signal received through the interface from a time when the control data indicating the second mode is received to a time when the control data indicating the first mode is received.

At least one among the plurality of display apparatuses may be further configured to receive the image signal transmitted by the electronic apparatus and transmit the image signal to another display apparatus through the interface corresponding to the image signal standard.

Each of the plurality of display apparatuses may be further configured to obtain correction data corresponding to each of the plurality of display apparatuses from the image signal transmitted from the electronic apparatus, and store corresponding correction data.

Each of the plurality of display apparatuses may be further configured to transmit information indicating completion of storing the correction data to the electronic apparatus in response to correction data from the image signal transmitted from the electronic apparatus being obtained and stored.

According to an aspect of yet another exemplary embodiment, there is provided a control method of an electronic apparatus which communicates with at least one of a plurality of display apparatuses, the method including: generating an image signal by converting correction data regarding each pixel of the plurality of display apparatuses into a data format according to an image signal standard; and transmitting the image signal to any one of the plurality of display apparatuses through an interface corresponding to the image signal standard.

The generating the image signal may include dividing correction data regarding a single pixel of plurality of display apparatuses into a plurality of data units based on a pixel data size which is defined in the data format, and generating the image signal by including each of the plurality of data units as individual pixel data.

The method may further include transmitting control data indicating one among a first mode in which a display operation with respect to the image signal transmitted through the interface is performed and a second mode in which a display operation is not performed to the plurality of display apparatuses.

The transmitting the control data may include transmitting the control data indicating the second mode to the plurality of display apparatuses when the image signal is transmitted.

The transmitting the control data may include transmitting the control data indicating the first mode to the plurality of display apparatuses in response to a pre-set period of time being past after the control data to convert a mode of the electronic apparatus to the second mode is transmitted.

DETAILED DESCRIPTION

Hereinafter, the terms used in exemplary embodiments will be briefly explained, and exemplary embodiments will be described in greater detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding exemplary embodiments. Accordingly, the terms used in the description should not necessarily be construed as simple names of the terms, but be defined based on meanings of the terms and overall contents of the present disclosure.

The example embodiments may vary, and may be provided in different example embodiments. Various example embodiments will be described with reference to accompanying drawings. However, this does not necessarily limit the scope of the exemplary embodiments to a specific form. Instead, modifications, equivalents and replacements included in the disclosed concept and technical scope of this specification may be employed. In describing the exemplary embodiments, well-known functions or constructions are not described in detail for conciseness.

The terms such as "first," "second," and so on may be used to describe a variety of elements, but the elements should not be limited by these terms. These terms are used simply for the purpose of differentiating one element from another.

Singular forms are intended to include plural forms unless clearly interpreted otherwise in a context. The terms, "include," "comprise," "is configured to," etc. of the description are used to indicate that there are features, numbers, steps, operations, elements, parts or combination thereof, and they should not exclude the possibilities of combination or addition of one or more features, numbers, steps, operations, elements, parts or combination thereof.

In an example embodiment, a "module" or a "unit" performs at least one function or operation, and may be realized as hardware (e.g., circuitry), firmware, software, or combination thereof. In addition, a plurality of "modules" or "units" may be integrated into at least one module and may be realized as at least one processor in an integrated manner except for "modules" or "units" that should be realized in specific hardware.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail for conciseness.

Hereinafter, exemplary embodiments will be described in detail with reference to accompanying drawings.

Figure 1:
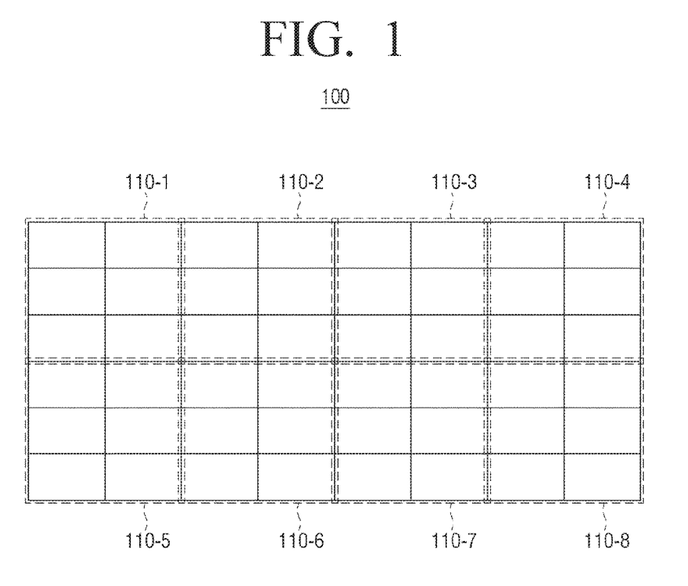
FIG. 1 is a view illustrating a display system according to an exemplary embodiment.
Figure 2:
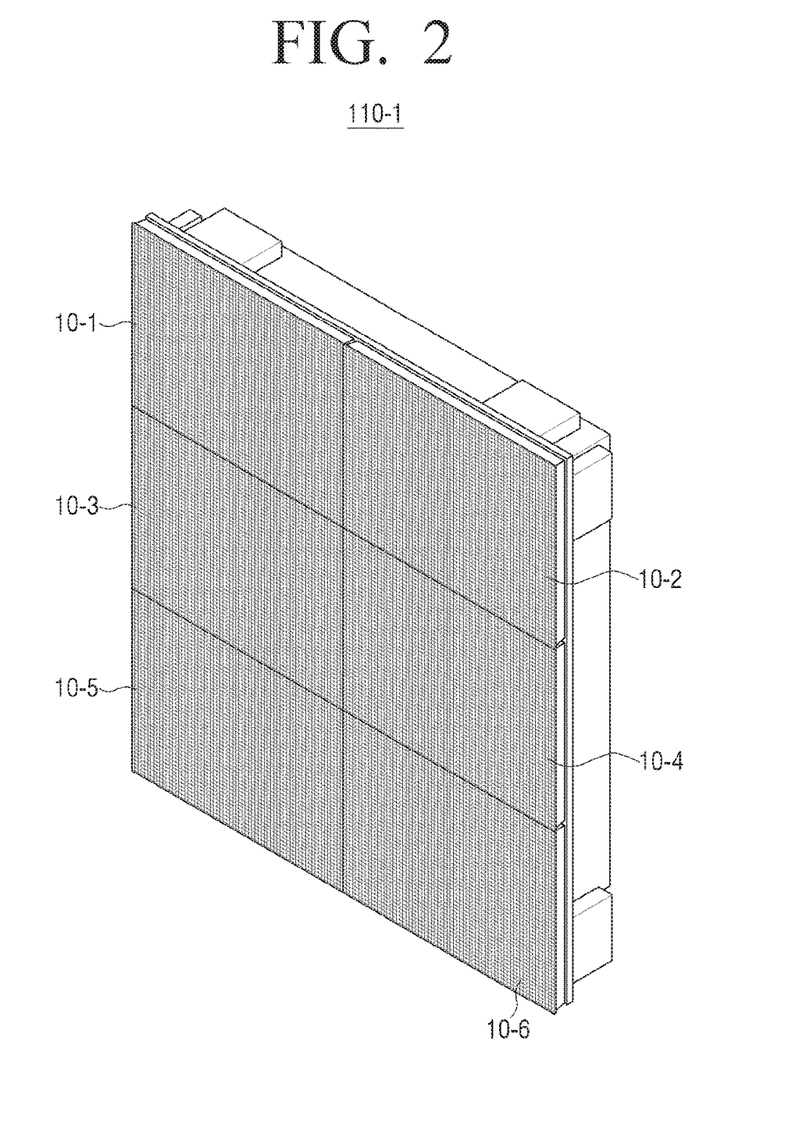
FIG. 2 is a view illustrating a display apparatus of a display system according to an exemplary embodiment.

FIG. 1 is a view illustrating a display system according to an exemplary embodiment, and FIG. 2 is a view illustrating one of a plurality of display apparatuses included in the display system.

Referring to FIG. 1, a display system 100 includes a plurality of display apparatuses 110-1 to 110-8, and the display apparatuses may be physically connected. FIG. 1 illustrates that the display system 100 includes eight display apparatuses but it only pertains to an exemplary embodiment, and the display system 100 may include various numbers of display apparatuses. Further, the display system 100 may be implemented as a single display apparatus.

With reference to FIG. 2, each of the plurality of display apparatuses 110-1 to 110-8 included in the display system 100 illustrated in FIG. 1 is described. Each of the plurality of display apparatuses may be identically embodied, and thus, FIG. 2 representatively illustrates a first display apparatus 110-1.

The first display apparatus 110-1 may include a plurality of display panels 10-1 to 10-6. As an exemplary embodiment, FIG. 2 illustrates that the first display apparatus 110-1 includes six display panels, but may include various numbers of display panels. Further, the number of display panels is not limited to be plural, and a single display panel may be included.

Each of the plurality of display panels 10-1 to 10-6 includes a plurality of pixels which are arranged in a matrix. In this case, the pixels may be light emitting diode (LED) pixels, and each of the pixels may include a red LED, a green LED and a blue LED. However, it is not limited thereto, and the plurality of display panels 10-1 to 10-6 may be implemented with a liquid crystal display (LCD), an organic LED (OLED), an active-matrix OLED (AMOLED), a plasma display panel (PDP), etc.

The plurality of display panels 10-1 to 10-6 included in the first display apparatus 110-1 may be disposed in a cabinet (not illustrated), and the cabinet may include a connecting portion by which the first display apparatus 110-1 can be connected with another display apparatus.

An image signal or control data input to one of the plurality of display apparatuses 110-1 to 110-8 may be consecutively transmitted to another display apparatus in a cascade method.

Each of the plurality of display apparatuses includes a processor, e.g., a timing controller (T-con), which controls a display panel to display an image corresponding to an input image signal, and includes a memory which stores correction data with respect to each pixel of the display panel.

The processor included in each of the plurality of display apparatuses 110-1 to 110-8 may obtain a signal matching a position of each display apparatus on the display system 100 from the received image signal, and control a panel of each display apparatus to display an image corresponding to the obtained signal.

Correction data stored in a memory of the respective display apparatuses 110-1 to 110-8 is to resolve a problem of color irregularity or a problem of lightness irregularity in an image displayed on the display system 100. For example, there may be a problem of color difference because a color displayed by a pixel of the first display apparatus 110-1 based on a certain pixel value differs from a color displayed by a pixel of the second display apparatus 110-2 based on the same pixel value, but the colors indicated by the two pixels may be the same by applying correction data.

It is necessary for each of the plurality of display apparatuses 110-1 to 110-8 to store correction which is necessary to each of the plurality of display apparatuses. In existing technology, transmitting correction data by connecting an electronic apparatus (for example, a PC) storing correction data with a single display apparatus, and in response to the completion of the correction data transmission with respect to the single display apparatus, removing and connecting the cable to another display apparatus should be repeated.

Accordingly, a considerable amount of time is consumed in transmitting the correction data. According to various exemplary embodiments of the disclosure, correction data may be transmitted through a path where an image signal is transmitted by generating the correction data into an image signal form. Therefore, the time to transmit the correction data may be innovatively reduced. Hereinafter, the various exemplary embodiments will be described in more detail.

Figure 3:
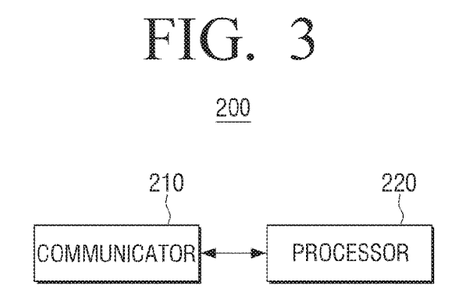
FIG. 3 is a view illustrating an electronic apparatus according to an exemplary embodiment.

FIG. 3 is a view illustrating a configuration of an electronic apparatus according to an exemplary embodiment.

FIG. 3 illustrates that an electronic apparatus 200 includes a communicator 210 and a processor 220. The electronic apparatus 200 may be embodied as various apparatuses such as, for example, a computer, a laptop, a cell phone and the like.

The communicator 210 is configured to communicate with various external apparatuses. The communicator 210 may communicate with at least one of the plurality of display apparatuses 110-1 to 110-8.

The communicator 210 may transmit an image signal to at least one of the plurality of display apparatuses 110-1 to 110-8 through an interface corresponding to a certain image signal standard. For example, the communicator 210 may transmit an image signal to at least one of the plurality of display apparatuses 110-1 to 110-8 through an interface such as a HDMI, an LVDS, a DVI, a DP, a HDBT and the like. Each of the plurality of display apparatuses 110-1 to 110-8 may support the interface, and may transmit the image signal consecutively to another display apparatus in a cascade method, by being connected to the interface.

The communicator 210 may transmit various control signals to control the plurality of display apparatuses 110-1 to 110-8, to at least one of the plurality of display apparatuses 110-1 to 110-8.

The communicator 210 may be connected with an external apparatus through local area network (LAN) and the Internet network, and be connected with an external apparatus through a wireless communication method (e.g., Z-wave, 4LoWPAN, RFID, Long-Term Evolution (LTE) Device-to-device (D2D), Bluetooth Low Energy (BLE), General Packet Radio Service (GPRS), Weightless, Edge Zigbee, ANT+, near-field communication (NFC), Infrared Data Association (IrDA), Digital Enhanced Cordless Telecommunications (DECT), wireless local area network (WLAN), Bluetooth, Wi-Fi, Wi-Fi Direct, Global System for Mobile Communications (GSM), Universal Mobile Telecommunications System (UMTS), Wireless Broadband (Wi-BRO), etc.) The communicator 210 may include various communication chips such as a Wi-Fi chip, Bluetooth chip, an NFC chip, a wireless communication chip and the like.

The processor 220 is configured to control overall operation of an electronic apparatus. The processor 220 may include at least one of a central processing unit (CPU), a controller, an application processor (AP), a communication processor (CP) and an ARM processor.

The processor 220 may include a graphic processing unit (not illustrated) for graphic process corresponding to an image. The processor 220 may be implemented as a core and a system on chip (SoC) including a graphics processing unit (GPU). The processor 220 may include a single core, a dual core, a triple core, a quad core, and a multiple core.

The processor 220 may generate correction data for each pixel of a plurality of display apparatuses.

According to an exemplary embodiment, the electronic apparatus 200 may further include a photographing unit (e.g., a camera) and the photographing unit may photograph an image displayed on the plurality of display apparatuses 110-1, 110-2, 110-3 and 110-4 and generate the photographed image, and the processor 220 may generate correction data based on the photographed image.

Specifically, the processor 220 may generate a plurality of pieces of correction data with respect to each pixel by calculating a correction value to be applied to each pixel by considering the color differences between respective pixels of the plurality of display apparatuses 110-1 to 110-8 indicated on the photographed image.

The processor 220 may receive correction data through an external apparatus through the communicator 210 without directly generating correction data.

Figure 4:
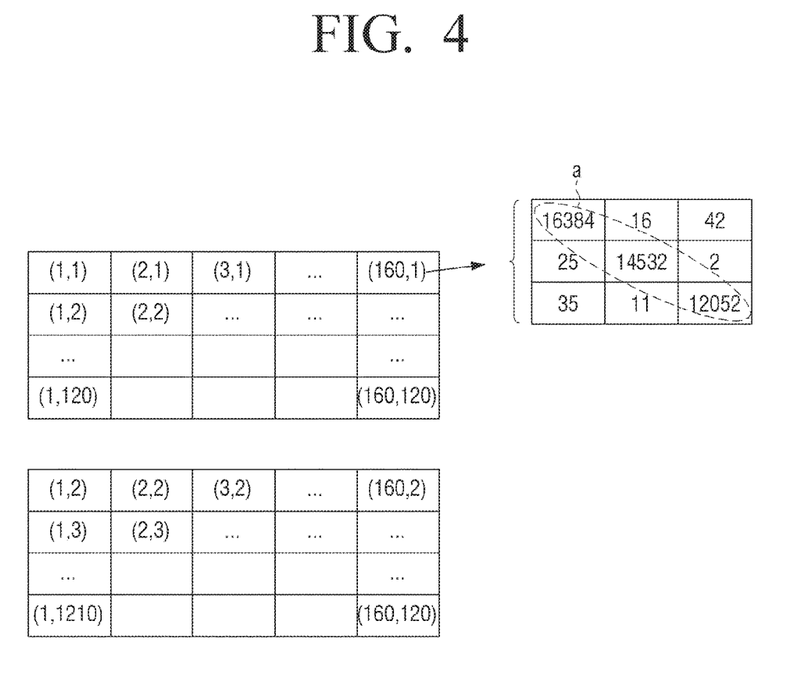
FIG. 4 is a view illustrating a correction data format according to an exemplary embodiment.

FIG. 4 is a view illustrating a correction data format.

The first display panel 10-1 among the plurality of display panels 10-1 to 10-6 of the first display apparatus 110-1, may be configured with, for example, 160×120 pixels. Each of the 160×120 pixels of the first display panel 10-1 is illustrated in the left side of FIG. 4 and correction data corresponding to one pixel of the first display panel 10-1 is illustrated on the right side of FIG. 4.

Specifically, referring to FIG. 4, as an example of a correction data format per pixel may be constituted with 3×3×14 bits. Diagonal component (a) in the correction data pertaining to one pixel may include information for pure color adjustment, and the rest of the component which is not the diagonal component (a), i.e., the non-diagonal component may include information for mixed color adjustment. Each component basically needs information of which size is as much as 14 bits but for non-diagonal components, a 12-bit size may be sufficient.

As the exemplary embodiment, when the first display panel 10-1 consists of 160×120 pixels, the first display apparatus 110-1 illustrated in FIG. 1 consists of 320×360 pixels and, in the same manner, the other display apparatuses 110-2 to 110-8 also consist of 320×360 pixels. Therefore, the plurality of display apparatuses 110-1 to 110-8 respectively need a plurality of correction data pieces corresponding to each of 320×360 pixels.

The processor 220 may convert the correction data with respect to each pixel of the plurality of display apparatuses 110-1 to 110-8 to a data format corresponding to a predetermined image signal standard and generate an image signal.

Herein, the predetermined image signal standard may correspond to any one interface of HDMI, LVDS, DVI, DP, HDBT, etc.

Specifically, the processor 220 may divide correction data with respect to one pixel into a plurality of data units based on a pixel data size defined in a data format corresponding to the predetermined image signal standard, and include each of the plurality of data units as individual pixel data to generate an image signal.

In this case, the processor 220 may generate an image signal by including information to identify a display apparatus to which the plurality of data units are transmitted, among the plurality of display apparatuses.

For example, if correction data with respect to a certain pixel has the format described with reference to FIG. 4, each diagonal component used to adjust pure color in correction data of one pixel needs information as much as 14 bits. For each non-diagonal component used to adjust mixed color, information as much as 12 bits is sufficient. In this case, correction data for one pixel includes information of which size is 114 bits.

Figure 5:
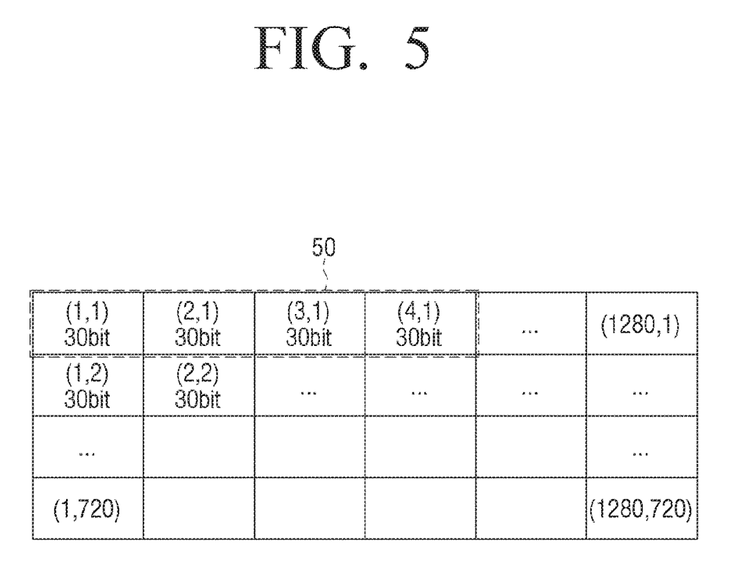
FIG. 5 is a view illustrating a data space of an image signal of a frame with 1280×720 resolution according to an exemplary embodiment.

For example, a size of the pixel data defied in the data format corresponding to the predetermined image signal standard may be 30 bits by adding R (10 bits), G (10 bits) and B (10 bits). To help one with understanding regarding a pixel data size, FIG. 5 is referred to. FIG. 5 illustrates a data space on an image signal of a single frame when it is assumed that the display system 100 consists of 1280×720 pixels, and illustrates that pixel data corresponding to one pixel is respectively 30 bits.

When the 114 bit correction data is divided by 30 bit pixel data size, it may be divided into four data units (30 bits, 30 bits, 30 bits and 24 bits), and thus, each of the four data units may be included in the image data as four pieces of pixel data. In other words, as illustrated in FIG. 5, a first data unit may be included in (1,1) pixel data, a second data unit may be included in (2,1) pixel data, a third data unit may be included in (3,1) pixel data and a fourth data unit may be included in (4,1) pixel data.

In this case, identification information of a display apparatus to which the four data units are to be transmitted among the plurality of display apparatuses 110-1 to 110-8 may be additionally included in four pixel data spaces (50). The identification information may be set by considering the number of display apparatuses included in the display system 100. As illustrated in FIG. 1, if the number of display apparatuses included in the display system 100 is eight, a size of identification information is sufficient with 3 bits. Meanwhile, one data unit of the four data units is 24 bits, the identification information may be 6 bit size.

In an image signal which is generated in the same manner, what includes four pieces of pixel data pertains to correction data with respect to one pixel. In this case, an image signal of a frame that the plurality of display apparatuses 110-1 to 110-8 receive may be configured as illustrated in FIG. 6.

Figure 6:
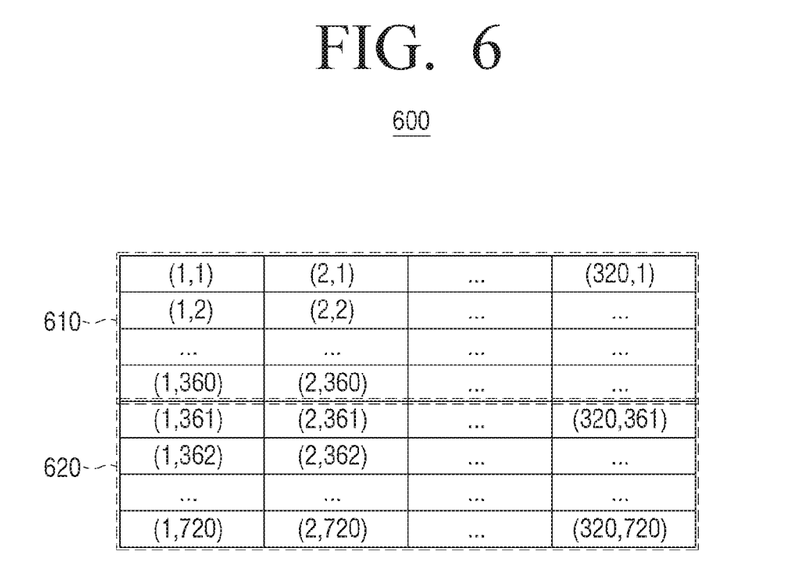
FIGS. 6 and 7 are views illustrating various examples of image signals including correction data.

FIG. 6 illustrates an image signal 600 in which 1280×720 pixel data is divided into four pieces of pixel data, and accordingly includes 320 pieces of correction data widthwise and 720 pieces of correction data lengthwise.

In the exemplary embodiment, since each of the plurality of display apparatuses 110-1 to 110-8 includes 320×360 pixels, the image signal 600 of one frame may include correction data pertaining to two display apparatuses. In other words, correction data 610 corresponding to the first display apparatus 110-1 and correction data 620 corresponding to the second display apparatus 110-2 may be included in the image signal of one frame. If an image signal pertaining to 60 frames for a second, the corresponding correction data may be transmitted to all of the eight display apparatuses included in the display system 100 within 4/60 seconds which is taken for an image signal corresponding to four frames to be sent.

Figure 7:
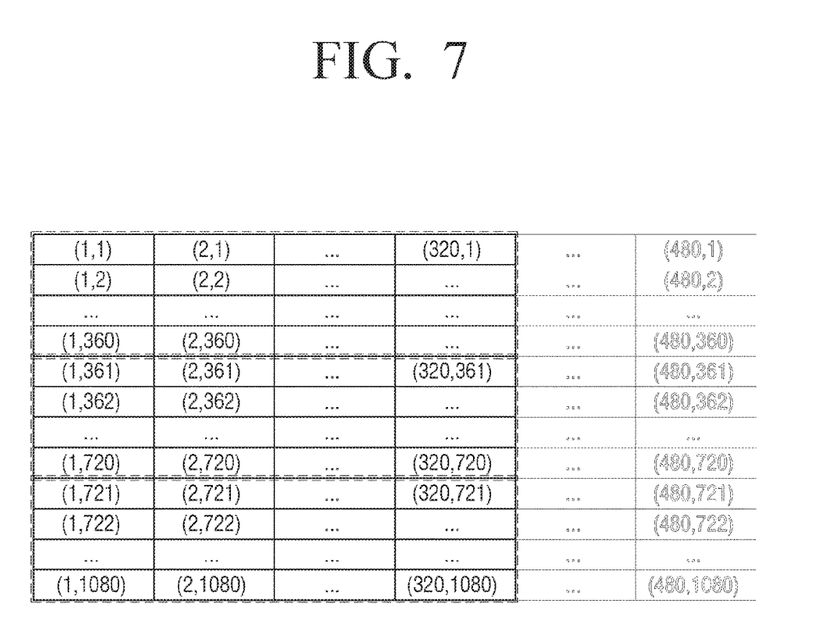

According to another exemplary embodiment, FIG. 7 illustrates, in case of a display system which is implemented with 1920×1080 resolution, consisting of 18 display apparatuses which consist of 320×360 pixels, an image signal 700 which can include 480 pieces of correction data widthwise and 1080 pieces of correction data lengthwise by dividing 1920×1080 pixel data into four pieces of pixel data.

The image signal 700 may include 480 pieces of correction data lengthwise, $321^{st}$ and higher number pixels are set as dummy data. There are 1080 pixels widthwise, and since per display apparatus needs information of 360 lines, correction data for three display apparatuses may be included in an image signal 700 of one frame. If an image signal pertaining to 60 frames is sent to for one second, corresponding correction data may be transmitted to all of 18 display apparatuses within 6/60 seconds which is taken for an image pertaining to six frames to be sent.

The processor 220, as described above, may control the communicator 210 to transmit an image signal generated based on the correction data to at least one of the plurality of display apparatuses through an interface corresponding to a predetermined image signal standard.

Figure 8:
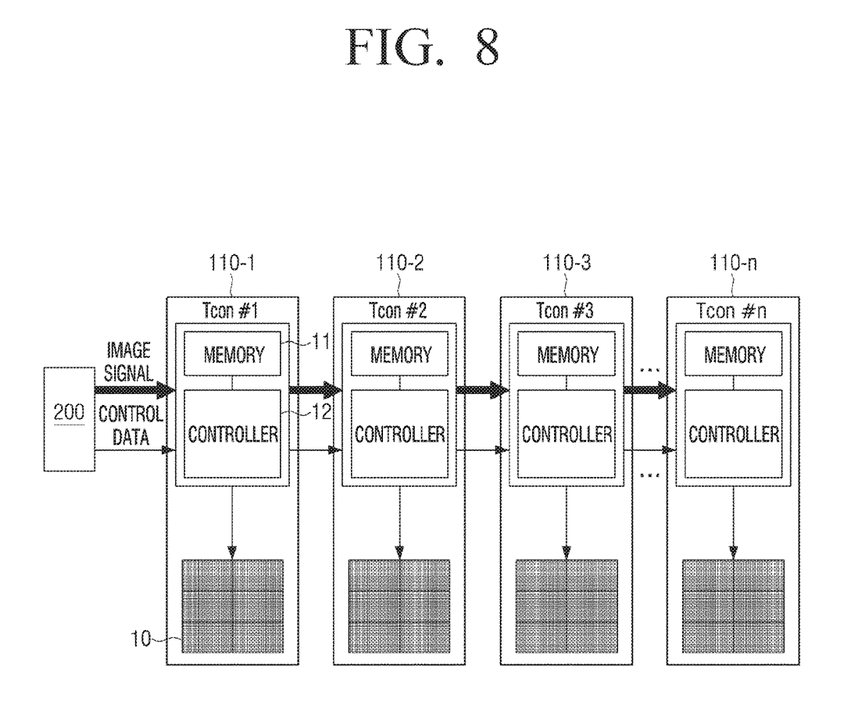
FIG. 8 is a view illustrating an image signal transmission of a plurality of display apparatuses according to an exemplary embodiment.

FIG. 8 is a view illustrating a method that an image signal generated based on correction data is transmitted to a plurality of display apparatuses.

Referring to FIG. 8, the electronic apparatus 200 transmits an image signal to the first display apparatus 110-1 among a plurality of display apparatuses 110-1 to 110-n through an interface corresponding to a predetermined image signal standard. In addition, the electronic apparatus 200 may transmit various control data for controlling the plurality of display apparatuses 110-1 to 110-n to the first display apparatus 110-1. A transmission path for control data may be different from a transmission path for image signal.

Each of the plurality of display apparatuses 110-1 to 110-n may include a T-con, and a memory 11 may store an input image signal. A controller 12 in the T-con may control displaying an image on the display panel 10 by generating a driving signal to drive a display panel 10 based on the input image signal and applying the driving signal to the display panel 10.

The plurality of display apparatuses 110-1 to 110-n are connected to each other through an interface to transmit the image signal. Therefore, the image signal input to the first display apparatus 110-1 may be consecutively transmitted to another display apparatus in a cascade method. In other words, all of the plurality of display apparatuses 110-1 to 110-n may receive an image signal in a method that the image signal input to the first display apparatus 110-1 is transmitted to the second display apparatus 110-2, and the image signal input to the second display apparatus 110-2 is transmitted to the third display apparatus 110-3. The interface may be HDMI, LVDS, DVI, DP, HDBT, and the like.

Through the same interface by which the image signal is transmitted from the electronic apparatus, an image signal may be transmitted from one display apparatus to another display apparatus.

The controller 12 may obtain correction data corresponding to the display panel 10 from the image signal generated based on the correction data and store the correction data in the memory 11 or another separate memory corresponding to the display panel 10. Other display apparatuses may, likewise, obtain correction data of their own from an image signal and store the correction data.

Specifically, as described, the image signal includes the information to identify a display apparatus to which correction data (a plurality of data units) with respect to each pixel is to be transmitted, and thus, based on this, the controller 12 may obtain only correction data corresponding to identification information corresponding to the first display apparatus 110-1 from the image signal.

According to the exemplary embodiment, if correction data corresponding to one pixel is included per data with four pixels, the controller 12 may obtain correction data in which each four pixels are grouped as data, the correction data corresponding to one pixel. Each pixel's correction data which is obtained in the above described manner is stored in a memory in the first display apparatus 110-1 to be applied in adjusting color or brightness of each pixel of the display panel 10.

A normal image signal and the image signal generated based correction data enter through the same interface, but the normal image signal and the image signal generated based correction data should be processed separately. For this, each of the plurality of display apparatuses 110-1 to 110-n may be operated in a first mode in which a display operation with respect to an input image signal is performed and in a second mode in which a display operation is not performed.

When each of the plurality of display apparatuses 110-1 to 110-n is operated in the first mode, each of the display apparatuses 110-1 to 110-n may process an input image signal and display an image on a display panel.

A conversion between the first mode and the second mode may occur based on control data received from the electronic apparatus 200.

Specifically, when an image signal generated based on correction data is transmitted, the processor 220 of the electronic apparatus 200 may control the communicator 210 to transmit control data for converting to the second mode, to the first display apparatus 110-1 among the plurality of display apparatuses 110-1 to 110-n.

The first display apparatus 110-1 may convert an operation mode to the second mode by receiving the control data and the control data may be consecutively transmitted to the other display apparatuses.

When the mode is converted to the second mode, each of the plurality of display apparatuses 110-1 to 110-n deletes pre-stored correction data in a memory and prepares to store new correction data.

With respect to the received image signal in the second mode, the controller 12 obtains correction data and stores the correction data in a memory as described above instead of not performing a display operation. In other words, the controller 12 may control an image corresponding to the image signal received in the second mode not to be displayed on the display panel 10.

When all of the display apparatuses 110-1 to 110-n respectively complete storing correction data by obtaining the correction data from an image signal, the mode may be converted to the first mode again.

Specifically, after transmitting the control data for converting to the second mode, in response to a preset period of time being past, the electronic apparatus 200 may transmit the control data for converting to the first mode to the first display apparatus 110-1. The preset period of time may be set as a period of time enough for the correction data to be stored in each of the plurality of display apparatuses 110-1 to 110-n.

For another exemplary embodiment, in response to correction data being obtained from an image signal transmitted from the electronic apparatus 200 and the correction data being stored, each of the plurality of display apparatuses 110-1 to 110-n may transmit information notifying completion of correction data storage to the electronic apparatus 200. When the information notifying the completion of correction data storage is received from all of the display apparatuses 110-1 to 110-n after the control data for converting to the second mode is transmitted, the electronic apparatus 200 may transmit the control data for converting to the first mode to the first display apparatus 110-1. The control data may be transmitted also to the other display apparatuses.

When even the electronic apparatus 200 transmits the image signal generated based on the correction data, a problem of a certain display apparatus not receiving the image signal because of a cascade method transmission error or a problem of an error in correction data obtaining operation in a certain display apparatus may occur. To resolve this problem, after transmitting the image signal generated based on the correction data, the electronic apparatus 200 may transmit control data for displaying a graphic object which notifies whether storing the correction data is completed, to the plurality of display apparatuses 110-1 to 110-n. If there is any display apparatus on which the graphic object is not displayed, it indicates that the correction data is not transmitted to the display apparatus, and thus, transmitting the correction data directly to the display apparatus may be performed.

It is described that the control data for converting to the first mode or to the second mode is transmitted separately from an image signal, but the control data may be transmitted by being included in the image signal.

With reference to FIG. 8, it is described that the electronic apparatus 200 is connected with only the first display apparatus 110-1 and transmits an image signal and control data, but when implemented, the electronic apparatus 200 may be connected with at least two display apparatuses in parallel.

With reference to FIG. 8, it is described that the electronic apparatus 200 directly transmits an image signal and control data to a display apparatus, but the electronic apparatus 200 may transmit an image signal and control data to a display apparatus through an intermediate apparatus. In other words, the intermediate apparatus may receive an image signal from the electronic apparatus 200 and transmit the received image signal to, e.g., the first display apparatus 110-1. The intermediate apparatus may be, e.g., a signal box (S-box.)

The signal box may process various images with respect to the input image signal, and, after the control data for converting to the second mode is received from the electronic apparatus 200 and before the control data for converting to the first mode is received, with respect to the image signal received from the electronic apparatus 200, a separate image process may not be performed. It is to avoid the correction data from being changed by the image process.

When an image signal based on the correction data is transmitted to the signal box, the electronic apparatus 200 may control the signal box to transmit the image signal to the display apparatuses, prior to other image signals.

Figure 9:
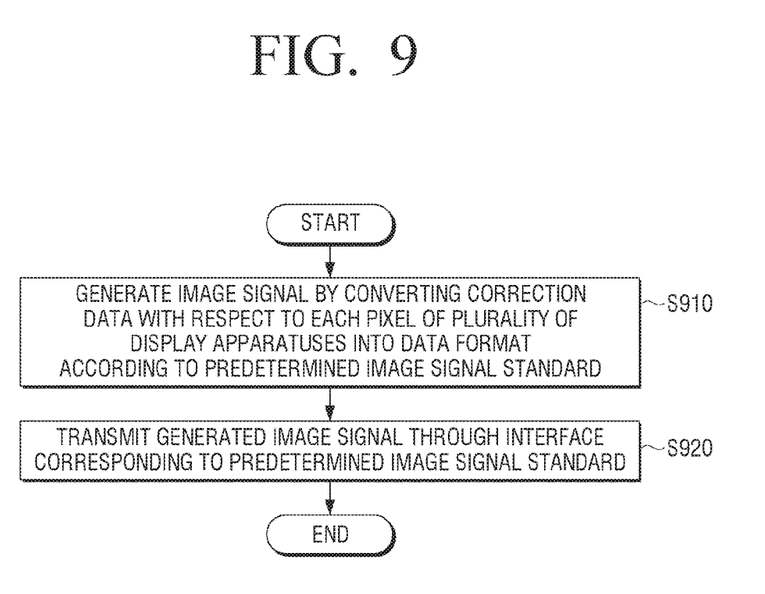
FIG. 9 is a flowchart explaining a control method of an electronic apparatus according to an exemplary embodiment.

FIG. 9 is a flowchart explaining a control method of an electronic apparatus which communicates with at least one of a plurality of display apparatuses according to an exemplary embodiment.

Referring to FIG. 9, the electronic apparatus 200 converts correction data for each pixel of the plurality of display apparatuses to a data format corresponding to a predetermined image signal standard and generates an image signal (S910).

In this case, the electronic apparatus 200 may generate the image signal by converting the correction data into a streaming data form.

The electronic apparatus 200 may generate an image signal by dividing correction data of one pixel into a plurality of data units based on the data format corresponding to the predetermined image signal standard and a format of the plurality of display apparatuses, and including each of the plurality of data units in a data space of one frame corresponding to the plurality of display apparatuses, as individual pixel data.

In the image signal generated in the above described method, the preset number of pixel data pieces correspond to correction data for one pixel, and the pieces of correction data in an image signal may be arranged corresponding to a pixel arrangement in a single display apparatus. Examples of such data arrangement are illustrated in FIGS. 6 and 7.

The electronic apparatus 200 transmits the generated image signal to any one of the plurality of display apparatuses through an interface corresponding to the predetermined image signal standard (S920).

The image signal may be transmitted by any one of the electronic apparatus 200 and the plurality of display apparatuses being directly connected, and it is also possible that the image signal is transmitted through an intermediate apparatus which is present between the electronic apparatus 200 and a display apparatus.

Specifically, the electronic apparatus 200 may inform a preparation situation for transmitting the image signal generated based on the correction data to a single display apparatus to the display apparatus by transmitting control data. In this case, the control data may be transmitted to the plurality of display apparatuses through serial communications.

In response to receiving the control data, the plurality of display apparatuses may mute a screen output, convert a mode into a mode for processing a normal image signal differently from protocol, and delete pre-stored correction data. In response to receiving the control data, the plurality of display apparatuses may turn off an image processing function with respect to an image signal. If the image processing function is performed in another apparatus, the control data may be transmitted to the apparatus and an image processing function may be turned off.

In such a state where the correction data is ready to be received, the electronic apparatus 200 becomes to transmit the generated image signal, and each of the plurality of display apparatuses may obtain correction data corresponding to each of the plurality of display apparatuses from the received image signal and store the correction data.

Each processor of the plurality of display apparatuses may make the obtained correction data to be transmitted to a display module and be stored in a memory (e.g., a flash memory) in the display module.

When storing the correction data is completed, each of the plurality of display apparatuses may transmit a return signal to the electronic apparatus 200, and the electronic apparatus, in response to the return signal being transmitted to the last display apparatus, may control the plurality of display apparatuses to convert a mode to a mode in which an image signal is processed in a general image signal protocol. With respect to an image signal which is received thereafter, the plurality of display apparatuses perform a display operation.

According to a method of transmitting correction data through an image signal line instead of the method that a user connects the cable one by one, e.g., in case that there are 200 display apparatuses, it takes about 1.2 second to transmit the correction data through the image signal path, and it takes about 30 seconds to store the correction data in a display module in parallel in each display apparatus. In other words, the time taken for the correction data to be finally written in the display module may be reduced to be less than one minute.

Various exemplary embodiments described above may be embodied in a recording medium that may be read by a computer or a similar apparatus to the computer by using software, hardware, or a combination thereof. Accordingly, exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, the exemplary embodiments in the disclosure may be implemented as the processor 130. In a software configuration, various exemplary embodiments described in the specification such as a procedure and a function may be embodied as separate software modules. The software modules may respectively perform one or more functions and operations described in the present specification.

Methods of controlling a display apparatus according to various exemplary embodiments may be stored on a non-transitory readable medium. The non-transitory readable medium may be installed and used in various types of apparatuses.

A non-transitory computer readable medium may refer to a machine-readable medium or device that stores data semi-permanently and not for a short period of time, such as a register, cache, memory, and the like. Specifically, programs of performing the above-described various methods can be stored in a non-transitory computer readable medium such as a CD, a DVD, a hard disk, a Blu-ray disk, universal serial bus (USB), a memory card, ROM, or the like, and can be provided.

The foregoing exemplary embodiments and advantages are merely exemplary and are not to be construed as limiting the present disclosure. The present teaching may be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An electronic apparatus, comprising:
    a communicator configured to communicate with at least one of a plurality of display apparatuses; and
    a processor configured to generate an image signal by converting correction data regarding each pixel of the plurality of display apparatuses into a data format according to an image signal standard, and control the communicator to transmit the image signal to any one of the plurality of display apparatuses through an interface corresponding to the image signal standard,
    wherein the processor is further configured to control the communicator to transmit control data to at least one of the plurality of display apparatuses for converting a state of the at least one of the plurality of display apparatuses from a first mode state into a second mode state, with the generated image signal based on the correction data, and
    wherein the first mode state is a state in which a display apparatus performs display function, and the second mode state is a state in which the display apparatus does not perform display function.

2. The electronic apparatus as claimed in claim 1, wherein the processor is further configured to divide correction data regarding a single pixel of one of the plurality of display apparatuses into a plurality of data units based on a pixel data size which is defined in the data format, and generate the image signal by including each of the plurality of data units as individual pixel data.

3. The electronic apparatus as claimed in claim 2, wherein the processor is further configured to include identification information identifying a corresponding display apparatus to which the plurality of data units are transmitted, among the plurality of display apparatuses.

4. The electronic apparatus as claimed in claim 1, wherein the processor is further configured to control the communicator to transmit the control data indicating the first mode state to at least one of the plurality of display apparatuses in response to a pre-set period of time passing after the control data indicating the second mode state is transmitted.

5. The electronic apparatus as claimed in claim 1, wherein the processor is further configured to control the communicator to transmit the control data indicating the first mode state to at least one of the plurality of display apparatuses in response to receiving information notifying completion of correction data storage from each of the plurality of display apparatuses.

6. The electronic apparatus as claimed in claim 1, wherein the interface corresponding to the image signal standard is one among a high-definition multimedia interface (HDMI), a low-voltage differential signaling (LVDS), a digital video interface (DVI), a display port (DP) and an HDBaseT (HDBT).

7. The electronic apparatus as claimed in claim 1, further comprising:
    a photographing unit configured to photograph an image which is displayed on the plurality of display apparatuses,
    wherein the processor is further configured to generate the correction data based on the photographed image.

8. A display system, comprising:
    a plurality of display apparatuses; and
    an electronic apparatus configured to generate an image signal by converting correction data regarding each pixel of the plurality of display apparatuses into a data format according to an image signal standard, and transmit the image signal to any one of the plurality of display apparatuses through an interface corresponding to the image signal standard,
    wherein the electronic apparatus is further configured to transmit control data to at least one of the plurality of display apparatuses for converting a state of the at least one of the plurality of display apparatuses from a first mode state into a second mode state, with the generated image signal based on the correction data, and
    wherein the first mode state is a state in which a display apparatus performs display function, and the second mode state is a state in which the display apparatus does not perform display function.

9. The display system as claimed in claim 8, wherein each of the plurality of display apparatuses are configured to operate in the first mode state and the second mode state.

10. The display system as claimed in claim 9,
    wherein each of the plurality of display apparatuses is further configured to not perform a display operation with respect to the image signal received through the interface from a time when the control data indicating the second mode state is received to a time when the control data indicating the first mode state is received.

11. The display system as claimed in claim 8, wherein at least one among the plurality of display apparatuses is further configured to receive the image signal transmitted by the electronic apparatus and transmit the image signal to another display apparatus through the interface corresponding to the image signal standard.

12. The display system as claimed in claim 8, wherein each of the plurality of display apparatuses is further configured to obtain correction data corresponding to each of the plurality of display apparatuses from the image signal transmitted from the electronic apparatus, and store corresponding correction data.

13. The display system as claimed in claim 8, wherein each of the plurality of display apparatuses is further configured to transmit information indicating completion of storing the correction data to the electronic apparatus in response to correction data from the image signal transmitted from the electronic apparatus being obtained and stored.

14. A control method of an electronic apparatus which communicates with at least one of a plurality of display apparatuses, the method comprising:

generating an image signal by converting correction data regarding each pixel of the plurality of display apparatuses into a data format according to an image signal standard;

transmitting the image signal to any one of the plurality of display apparatuses through an interface corresponding to the image signal standard; and transmitting control data to at least one of the plurality of display apparatuses for converting a state of the at least one of the plurality of display apparatuses from a first mode state into a second mode state, with the generated image signal based on the correction data, and wherein the first mode state is a state in which a display apparatus performs display function, and the second mode state is a state in which the display apparatus does not perform display function.

15. The method as claimed in claim 14, wherein the generating the image signal comprises dividing correction data regarding a single pixel of plurality of display apparatuses into a plurality of data units based on a pixel data size which is defined in the data format, and generating the image signal by including each of the plurality of data units as individual pixel data.

16. The method as claimed in claim 14, wherein the transmitting the control data comprises transmitting the control data indicating the first mode state to at least one of the plurality of display apparatuses in response to a pre-set period of time being past after the control data to convert a state of the electronic apparatus to the second mode state is transmitted.

* * * * *